United States Patent [19]

Barber

[11] 4,244,071
[45] Jan. 13, 1981

[54] COMPACT ROLLOVER VEHICLE WASH APPARATUS

[75] Inventor: Ivan J. Barber, Ontario, Canada

[73] Assignee: The Allen Group, Inc., Melville, N.Y.

[21] Appl. No.: 62,159

[22] Filed: Jul. 30, 1979

[51] Int. Cl.³ .............................................. B60S 3/06
[52] U.S. Cl. ................................. 15/53 A; 15/DIG. 2
[58] Field of Search ........... 15/56 A, 56 AB, DIG. 2, 15/97 B

[56] References Cited

U.S. PATENT DOCUMENTS

| 3,336,622 | 8/1967 | Kullwitz et al. | 15/53 A |
| 3,626,536 | 12/1971 | Napoli | 15/53 A |

Primary Examiner—Edward L. Roberts
Attorney, Agent, or Firm—Fulwider, Patton, Rieber, Lee & Utecht

[57] ABSTRACT

There is disclosed a vehicle wash apparatus including a wash arch frame carried on tracks extending longitudinally of a wash stall in which a car to be washed is parked. Overhead arms are pivotally carried on their respective one ends from an overhead transverse horizontal pivot shaft and mount a horizontally disposed rotary top brush from the free ends thereof for selective lowering into a position for contacting the front of a vehicle to wash the grill and for travel rearwardly along the hood, top and trunk of the vehicle. Side brush arms are carried pivotally from the sides of the arch frame for rotation about vertical axes and project in a direction opposite the direction in which the top brush arms, in their retracted positions, project and are urged inwardly to wash the sides of the car as the arch carries the top brush rearwardly on the tracks. Such side arms are pivoted inwardly as the side brushes clear the rear corners of the car to carry the side brushes about the rear corners of the vehicle to wash the rear thereof as the top brush completes washing of the top of the trunk.

6 Claims, 18 Drawing Figures

COMPACT ROLLOVER VEHICLE WASH APPARATUS

BACKGROUND OF THE INVENTION

1. Field of the Invention

The vehicle wash apparatus of the present invention relates to a relatively compact device for automatically washing a vehicle parked in a washing stall.

2. Description of the Prior Art

Numerous different car wash devices have been proposed for automatically washing a vehicle. Typical of such prior art car washing devices are tunnel type washing devices, where a car to be washed is towed along a pathway while side brushes wash the front sides and rear of the car while a top brush simultaneously washes the hood, top and trunk of the car. Such devices are desirable for wash installations having a high demand, the relatively substantial initial investment being justified by the high rate at which cars may be washed thereby.

Other car wash devices have been proposed which are relatively compact for installation in, as for example, gas stations washing stalls where the limited space will not permit tunnel type washes and the relatively low volume of washes will not justify the investment normally associated with tunnel type wash devices. Rollover washing devices have been proposed for such applications and are typically in the form of an arch frame carrying a top brush from the free ends of top arms mounted at their respective one ends from a horizontal pivot shaft for washing the hood, top and trunk of the car as such arch passes thereover. The side brushes are typically carried from the upper portion of the arch by means of a parallelogramatic arrangement mounting the side brushes on the lower extremity thereof and urgable inwardly to wash the front, sides and rear of a car parked under the arch. This arrangement, while being satisfactory in performance, suffers the shortcoming that the parallelogramatic side arm mounts are relatively expensive to manufacture and assemble and require a relatively large number of control switches and control elements for automatic operation thereof, thus rendering the initial investment and maintenance costs somewhat prohibitive for low volume installations.

SUMMARY OF THE INVENTION

The car wash apparatus of the present invention is characterized by a rollover arch carrying one end of a top brush arm therefrom by means of a horizontal pivot for normal projection forwardly relative to a car parked thereunder. A top brush is carried on the front extremity of such arm and may be lowered by pivoting such arm down to wash the front and top surfaces of the car. Vertical side brushes are carried from the sides of the arch by means of side brush arms mounted on pivots spaced rearwardly of such top brush pivot for pivoting about respective vertical axes. In their retracted position, such side brush arms project rearwardly along the sides of the car and are urgable inwardly to wash the sides of the car and, as they clear the rear corners thereof, to be carried inwardly along the rear of the car to wash the rear of the car.

Other objects and features, of the present invention will become apparent when considered with the detailed description of the presently preferred embodiments.

DESCRIPTION OF THE DRAWINGS

FIG. 17 is a side elevational view of a second embodiment of the car wash apparatus of the present invention; and, FIG. 18 is a top plan view, partially broken away, of the car wash apparatus shown in FIG. 17.

DESCRIPTION OF THE PREFERRED EMBODIMENTS

Figure 1:
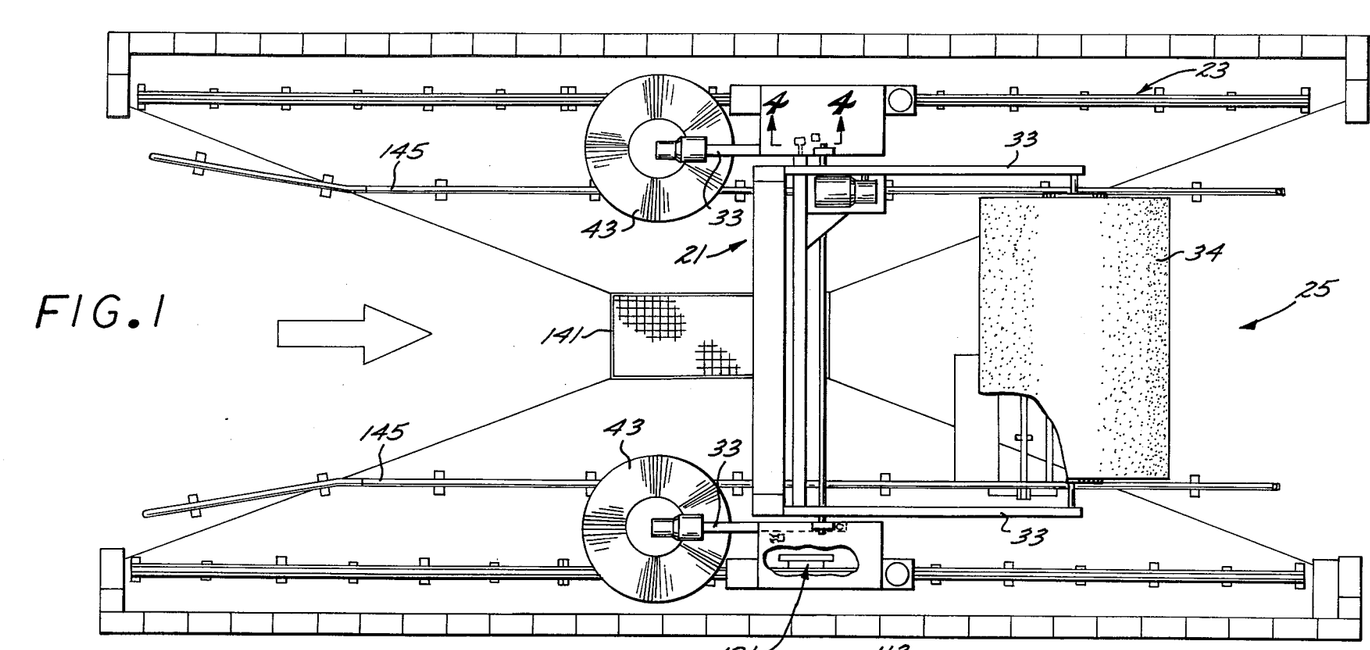
FIG. 1 is a top plan view of a car wash apparatus embodying the present invention.
Figures 2, 3:
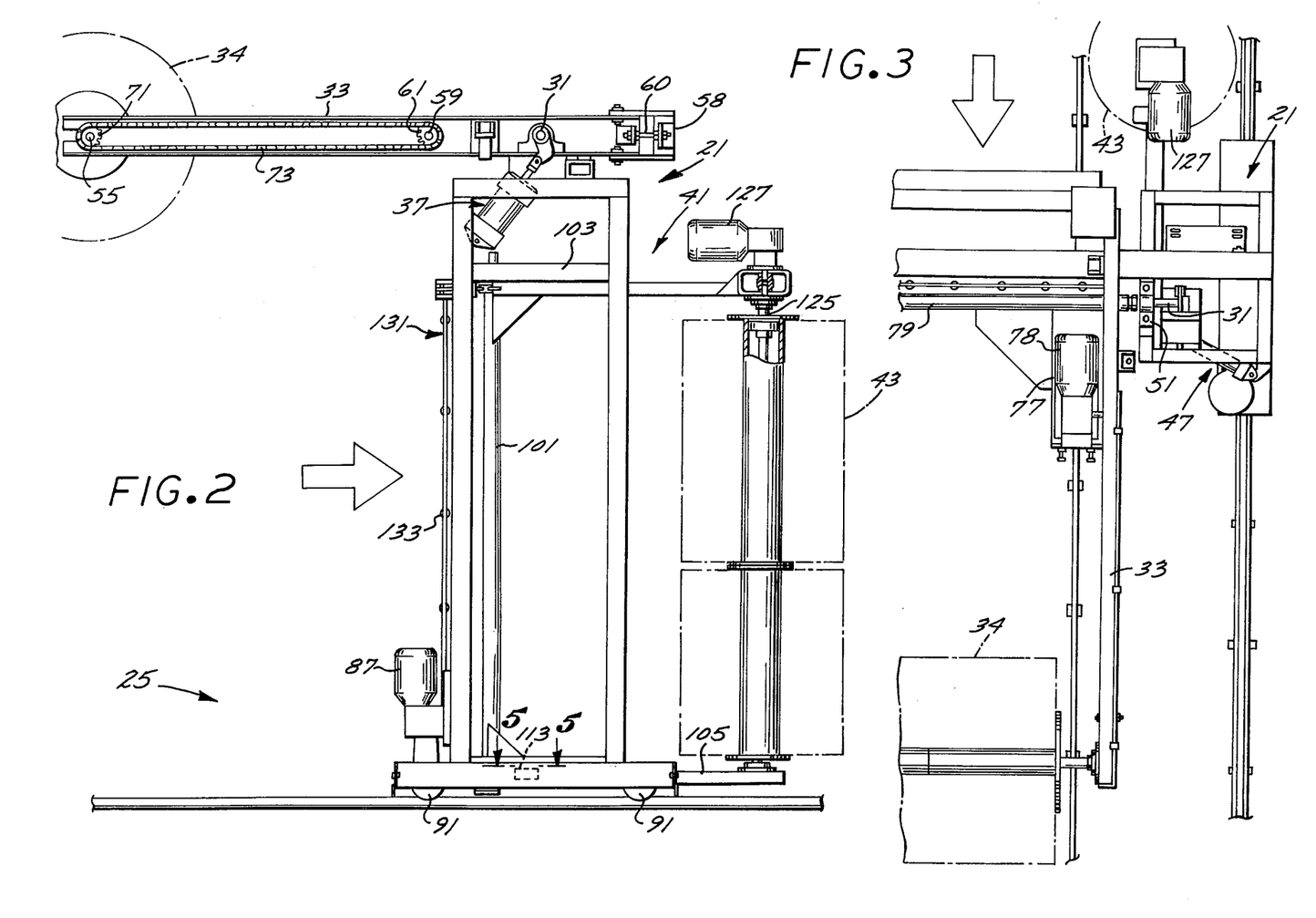
FIG. 2 is a side view of the car wash apparatus shown in FIG. 1.
FIG. 3 is a partial top plan view, in enlarged scale, of the car wash apparatus shown in FIG. 1.
Figure 7:
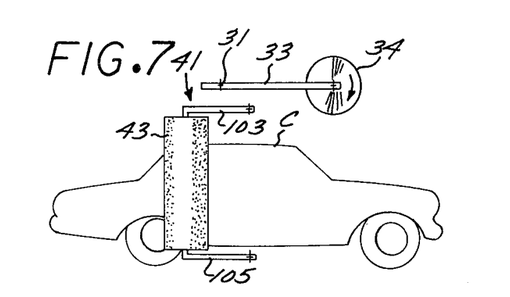
FIGS. 7–16 are diagrammatic views depicting the car wash apparatus shown in FIG. 1 in operation.
Figure 8:
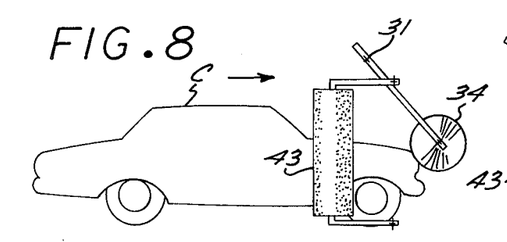
Figures 9, 14:
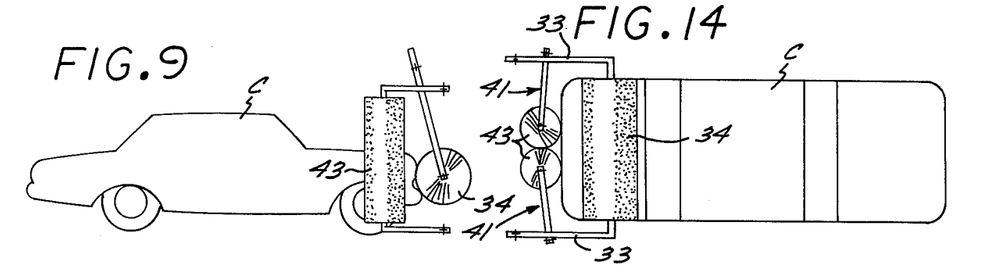
Figure 10:
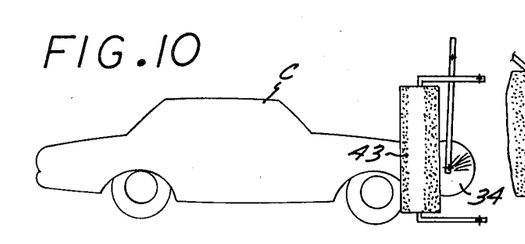
Figure 11:
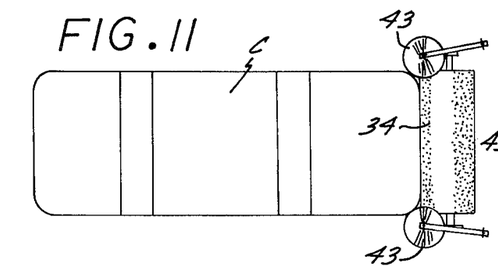
Figure 12:
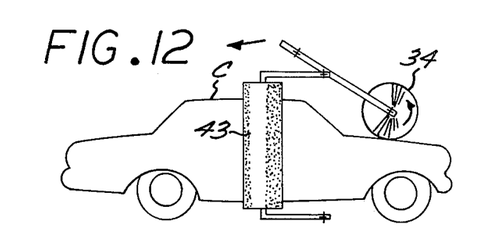
Figure 13:
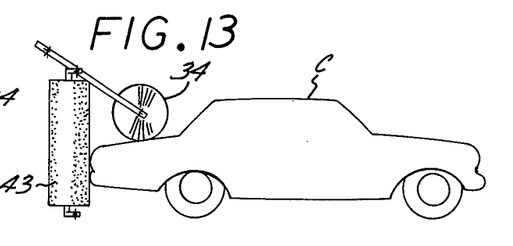
Figure 15:
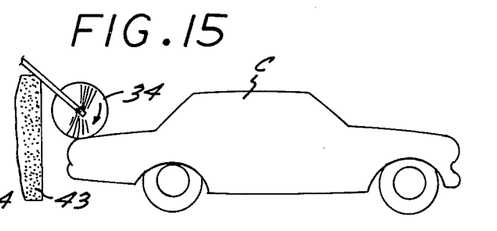

Referring to FIGS. 1, 3 and 7, the car wash apparatus of the present invention includes, generally, an arch frame 21 rollably mounted on parallel tracks 23 (FIG. 1) projecting longitudinally of a car wash bay 25. Mounted from the top of the arch frame 21 by means of a horizontal pivot shaft 31, is a pair of parallel top brush arms 33 normally projecting forwardly along the bay 25 and being urgable to a lowered position by means of a hydraulic cylinder 37 to assume an extreme lowered position level with the front bumper of a vehicle to be washed as shown in FIG. 10. The side arm assemblies 41 are pivotally mounted to the sides of the arch frame 21 for rotation about vertical axes and project rearwardly to carry vertically projecting side brushes 43 on their free extremities. Such side arm assemblies are urged to their extended position contacting the sides of the car as shown in FIG. 11 by means of side arm cylinders 47 (FIG. 3), to wash the sides of the car and are further extended as such brushes clear the rear corners of the car to move inwardly thereacross to their fully extended position shown in FIG. 14, to wash the rear of such car.

Referring to FIG. 2, the arch frame 21 shown in the preferred embodiment is constructed of channels forming opposed vertical columns connected together by an overhang which supports the opposite ends of the overhead shaft 31 by means of pillow blocks 51. The overhead arms 33 are in the form of parallel channels mounted on the opposite ends of the shaft 31 and projecting forwardly therefrom to carry their forward ends the axle shaft 55 of the top brush 34. Such top brush arms project a short distance rearwardly of the support shaft 31 and carry a counterweight 58 (FIG. 2) therefrom. If desirable such counterweight 58 may be slightly offset forwardly of the vertical plane of the arms 33 as shown in FIG. 10 to, when the arms 33 are in their lowered position, urge such brush rearwardly around the pivot shaft 31 and against the grill of a forwardly moving car as shown in FIG. 9. The longitudinal location of such counterweight 58 is adjustable by means of adjustment bolts 60. One of the channels 33 has a stub shaft 59 (FIG. 2) mounted intermediately therein with a driven sprocket 61 carried on one end thereof and connected to a sprocket 71 keyed to the brush shaft 55, such coupling being by means of a drive chain 73.

Referring to FIG. 3, mounted adjacent the end of the stub shaft 59 opposite the driven pinion 61, is a motor mount bracket 77 (FIG. 3) mounting a top brush drive motor 78 which is coupled with the stub shaft 59 (FIG. 2). The top brush arms 33 are preferrably counterweighted to counterbalance the weight of the top brush 34 and have a mounting tube 79 welded therebetween and telescoped over the top brush support shaft 31.

Figure 4:
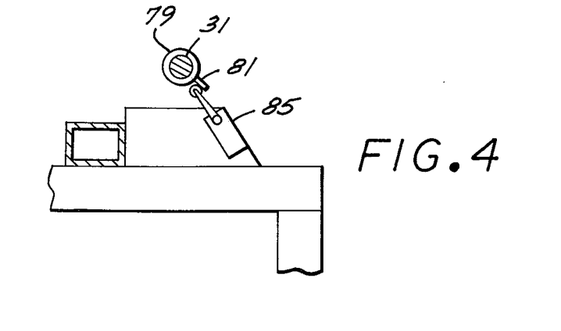
FIG. 4 is a sectional view, in enlarged scale, taken along the line 4—4 of FIG. 1.

Referring to FIG. 4, a top brush control cam 81 is mounted on one end of the top brush shaft 3 for selective engagement with a control switch 85 electrically coupled, through a control panel 197 (FIG. 6), with an electrical drive motor 87 (FIG. 2) which is coupled with one of the truck wheels 91 carrying the frame 21 from the tracks 23. In the preferred embodiment, the control panel 197 includes a time delay capacitor which allows the truck drive motor 87 to operate for a predetermined period of time after actuation of the switch 85 before the direction of rotation of such motor is reversed to commence reversed travel of the arch frame 21.

Figure 5:
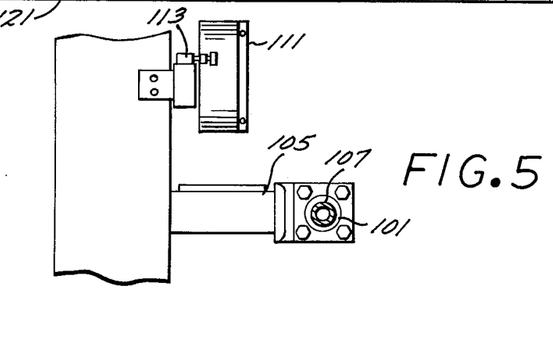
FIG. 5 is a sectional view, in enlarged scale, taken along the line 5—5 of FIG. 2.

Referring to FIGS. 2 and 5, the side brush arm assemblies include vertical tubes 101 having rigid straight upper and lower horizontal arms 103 and 105 projecting therefrom for mounting the opposite ends of the sdie brushes 43 therebetween. The tubes 101 are telescoped over vertical side brush pivot shafts 107 (FIG. 5) spaced forwardly of the vertical plane of the top brush support shaft 31 and carry the arms 103 and 105 projecting rearwardly beyond the top brush mounting shaft 31. It will be appreciated that the side brush pivot shafts 107 should be spaced as far forwardly of the top brush support shaft 31 as possible, without causing interference between the top brush arm 33 and the side brush arms 103 and 105 during travel of such top brush arm to its fully lowered position and travel of such side brush arms to their fully extended travel.

Referring to FIG. 2, connected between the free ends of the upper and lower side brush arms 103 and 105, are respective vertical shafts 125, which mount the respective hubs of the side brushes 43 and accoupled on their respective upper extremities with respective side brush drive motors 127.

Figure 16:
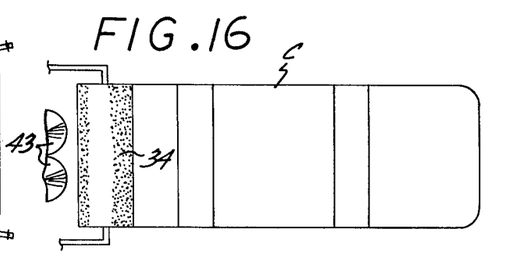

Projecting from one of the lower side brush arms 105, is a switch actuator 111 for selective contact with a plunger actuated control switch 113 mounted on the frame 21. The switch 113 is connected through the control 197 with the truck drive motor 87. In the preferred embodiment, the control 197 incorporates a time delay to permit a predetermined amount of additional travel after such switch has been actuated and the side arms 41 are in the position shown in FIG. 14 to permit the top brush 34 to reach the extreme of its rearward travel as shown in FIG. 16, to wash the entire top of the car trunk before reversing the direction of rotation of such drive motor 21.

Referring to FIG. 1, a pressure actuated pedal switch, generally designated 121, is mounted centrally adjacent one of the tracks 23 and is coupled through the control panel 197 with the drive motor 87, such switch being actuable only during travel of the arch 21 from the rear of the car to a position intermediate over such car, to thus render the truck drive motor 87 inoperative.

Referring to FIG. 2, a water arch tube, generally designated as 131, extends about the arch 21 and has spray nozzles 133 mounted thereon for spraying water onto a car as the arch travels over the car.

Referring to FIG. 1, the floor of the bay 25 preferably slopes inwardly into a central drain 141 and has a pair of tire guide rails 145 extending along the opposite sides to guide the car tires as a car is brought into a position the arch.

Figure 6:
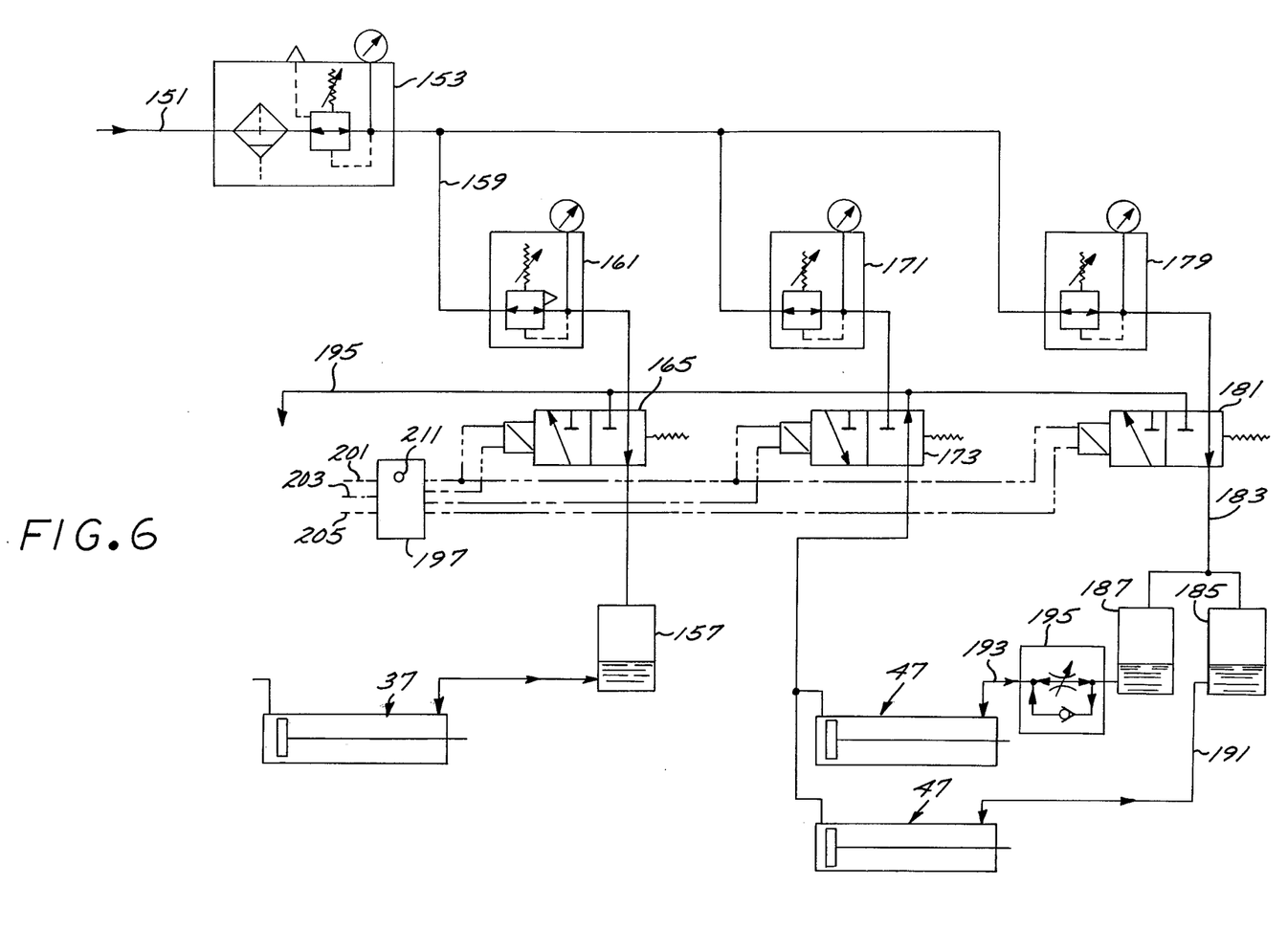
FIG. 6 is a schematic view of the hydraulic-pneumatic controls for the car wash apparatus shown in FIG. 1.

Referring to FIG. 6, an air and hydraulic fluid system is provided for controlling positioning of the top brush cylinder 37 and side brush cylinders 47 and includes an air inlet conduit 151 connected with an air filter and regulator assembly 153. The outlet from the regulator assembly 153 is connected with the top of an air-oil reservoir 157 by means of an air conduit 159 having a pressure regulator 161 therein with pressurization and venting of such reservoir being controlled by means of a normally open three-way, two positioned solenoid valve 165. The bottom of the air-oil reservoir 157 is connected with the piston end of the top brush piston 37, the opposite end of such cylinder being vented to atmosphere and the weight of the brush 34 normally serving to draw the piston of such cylinder towards its extended position against the pressure of the oil from the reservoir 157.

The outlet from the filter regulator assembly 153 is also connected through a regulator 171 leading to a normally closed three-way, two positioned solenoid valve 173 controlling flow of air from the blind ends of the side brush cylinders 47.

Connected in parallel with the regulator 171, is a side brush retraction regulator 179, regulating pressure to a normally open three-way, two position side brush retraction solenoid 181 controlling air pressure to a conduit 183 which branches out to connect with the respective tops of right and left hand air-oil reservoirs 185 and 187. The bottom of the right hand side brush reservoir 185 is connected with the rod end of the right hand cylinder 47 by means of a conduit 191 and the bottom of the left hand reservoir 187 is connected with the rod end of the left hand cylinder 47 by means of a conduit 193 incorporating a flow control valve 195. The solenoid valves 165, 173 and 181, may be of any commercially acceptable three-way, two positioned valve, and the exhaust ports thereof are connected with an exhaust conduit 195. The solenoids of such valves are connected with a control 197, which is controlled by electrical leads 201, 203 and 205, leading to the top brush reversing switch 85, the side brush reversing switch 113 and stop pressure switch 121, respectively (FIGS. 4, 5 and 1). Operation of the system may be initiated in any desirable fashion, as for example a coin actuated mechanism, but in the embodiment depicted is started by means of a start button 211 mounted on the control panel 197 (FIG. 6).

In operation, when the car washing apparatus of the present invention is to be utilized, a car to be washed is driven into the bay 25 facing forwardly, for example, in the same direction as the top brush arms 33 project from the arch frame 21 to position the car C generally midway under such arch, the tire guide rails 145 (FIG. 1) serving to guide the wheels of such car against contact with the side arch. The start button 211 (FIG. 6) may then be depressed to actuate the brush arm solenoid valves 165 and 181 to exhaust pressure from the rod ends of the top brush cylinder 37 and side brush cylinders 47, to open the solenoid valve 173 to communicate approximately 20 psi of air to the blind, or butt, ends of the side brush cylinders 47 to urge the side brush arm assemblies 41 to their extended side wash positions as shown in FIG. 11. Exhausting pressure from the rod end of the top brush cylinder 37 allows the weight of the top brush 34 to draw the free end of the top brush arms 33 downwardly, to engage the top brush 34 with the hood of the car or the front window of a van as the case may be. One of the top brush arms 33, while lowering contacts a switch (not shown) to energize the side brush drive motor 127, top brush motor 77 (FIG. 3), and to open a valve controlling water to the spray arch 131. The truck drive motor 87 is also energized to drive the truck drive wheels 91 on the track 23, to move the arch 21 forwardly along the car to cause the side brushes 43 to wash the forward sides of the car while the top brush 34 is pushed forwardly over the hood and then descended downwardly over the grill of the car to wash the front end thereof.

As the top brush 34 clears the front end of the hood 34, and moves downwardly across the grill and onto the front bumper to cause the top brush arms 33 to assume vertical position as shown in FIG. 11, the top brush reversing switch cam 81 will contact the switch 85 (FIG. 4), thus actuating the control 197 to, after a predetermined period of time, and after the side brushes 43 have reached the front corners of the car, cause the truck drive motor 87 and top brush drive motor 78 to reverse directions, thus reversing the direction of rotation of the top brush 34 and reversing the direction of travel of the arch 21 on the track 23. It will be apparent that such reversal may also be effected by a contact switch located in the path of the arch 21 or in any other desired manner. In certain embodiments, it is desirable not to reverse the direction of the top brush rotation and, in those emobidments merely the direction of travel of the arch is reversed at this point.

As the arch frame moves rearwardly over the car, the top brush 34 will be drawn upwardly across the grill and the side brushes 43 will be pushed rearwardly along the sides of the car and, as such side brushes 43 clear the back corners of the opposite sides of the car, the side brush arm assemblies 41 will be urged inwardly about their vertical pivots by means of the air pressure on the butt ends of the side arm cylinders 47. Such inward rotation of the side arm assemblies 41 will cause the side brushes 43 to be moved inwardly around the rear corners of the car. Initial inward swinging of the side arm assemblies 41 actuates the switch 113 (FIG. 5) to cause the control 197 to open the solenoid 181, to apply about 20 psi to the tops of the air-oil reservoirs 185 and 187 to thereby pressurize the rod ends of the cylinders 47 to about 27 psi, thus decreasing the inward bias on the side brushes 43 below the 40 psi applied during rearward travel along the car. However, such 20 psi differential on the pistons of the cylinders 47 is sufficient to maintain continued inward swinging of the side arms 41 to cause the side brushes 43 to travel inwardly across the rear of the car to their central confronting position shown in FIG. 14.

Continued rearward travel of the arch 21 permits the arm assemblies 41 to swing even further forwardly relative to such arch to carry the top brush 34 over the rear of the trunk. The control 197 then opens the top brush solenoid valve 165 to pressurize the rod end of the top brush cylinder 37, thus raising the top brush to the elevated position shown in FIG. 7. Concurrently, the control 197 reverse truck drive motor 87, thus reversing travel of the arch to carry the arch forwardly to the central position over the car where the truck engages the pressure plate switch 121 to de-energize the truck drive motor 87 and open the side brush retraction solenoid 173 to vent the 40 psi from the butt ends of the side brush cylinders 47 and enable the 20 psi remaining on the rod ends thereof to retract the pistons within such cylinders 47 to retract the side brushes 43 to their retracted position spaced from the sides of the car as shown in FIG. 1.

Figures 17, 18:
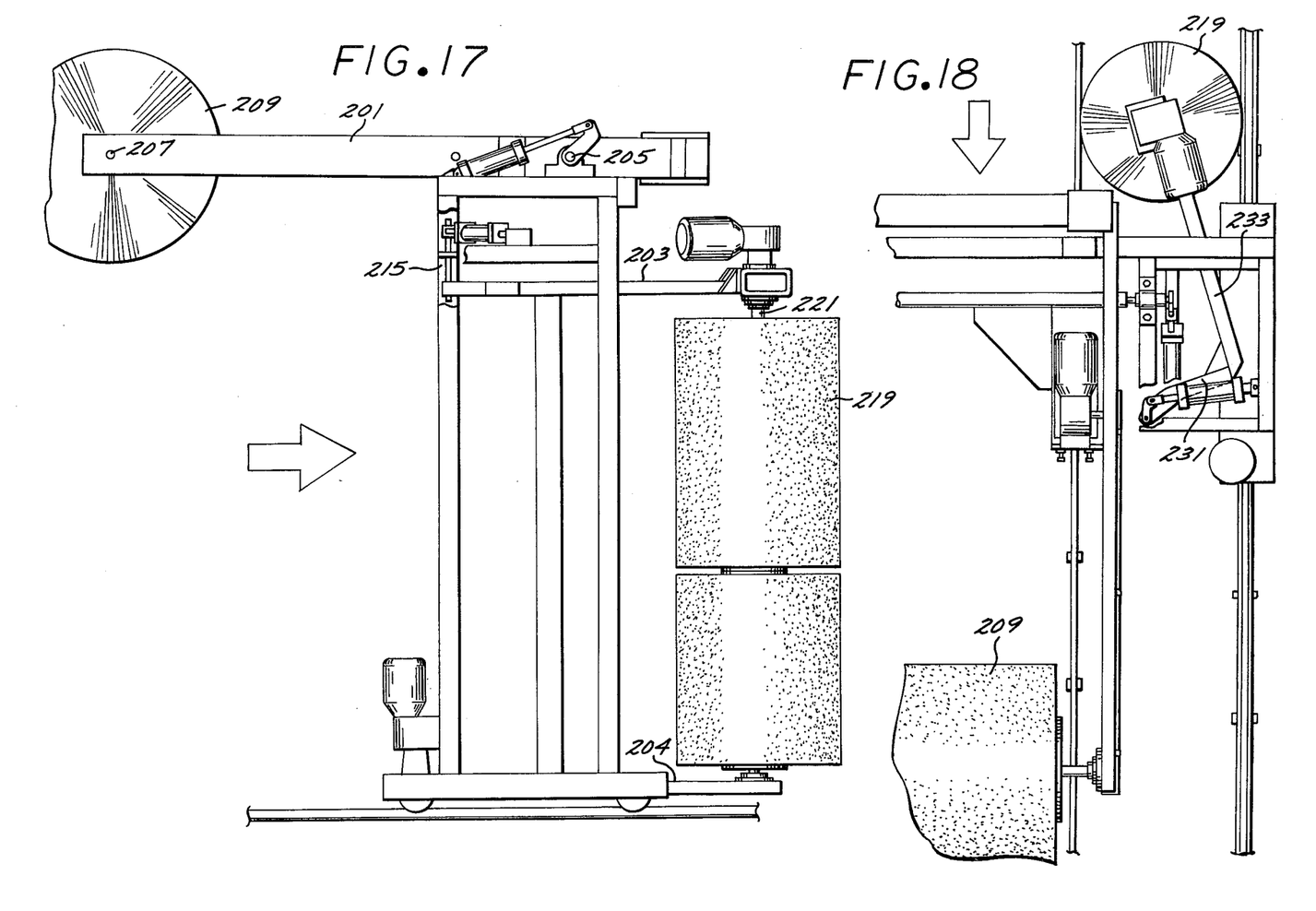

The car wash apparatus shown in FIGS. 17 and 18 is similar to that shown in FIGS. 1–6, except that the top brush arm 201, upper and bottom arms 203 and 204 are shorter and the pivot mounting points thereof are spaced farther apart to provide more overlap at the pivot extremities of such arms when such arms are in their retracted position shown in FIG. 17 to reduce the amount of travel by each brush, shorten the period required for a full wash cycle and render the overall apparatus more compact.

In order to accommodate full swing of the side brush upper mounting arms 203 as the rear of the car is being washed and the top brush 209 is in its lowered position, the upper side brush arm 203 is formed with a perpendicular bend to form a short primary arm section 231 (FIG. 18), which rigidly carries an elongated secondary arm section 233 therefrom. Thus the lowered top brush arm 201 may be received in the bend of the upper thereof such that the side brushes 209 will be moved entirely inwardly across the rear of the car without interference with such top brush arm. It will be noted that operation of the car wash apparatus shown in FIGS. 17 and 18 is identical to that described hereinabove, except that the distance of travel during the working stroke for each side and top brush is less.

From the foregoing, it will be apparent that the car wash system of the present invention provides a compact, economical and convenient means for automatically washing a car with only the minimum number of control elements, while providing a long and maintenance free service life.

I claim:

1. A compact rollover vehicle wash apparatus for washing a vehicle having front, back, top and opposite side surfaces, parked in a wash stall and facing forwardly in one direction and comprising:

track means extending longitudinally of said stall;
  an arch frame over said stall;
  trucks mounting said frame rollably on said track means;
  top brush arms pivotally carried on their respective one extremities from the top of said arch for rotation about a horizontal axis and normally projecting forwardly therefrom and pivotable from a horizontal retracted position to a lowered operative position;
  a horizontal top brush mounted from the free ends of said arms for being carried to a lowered position level with the bottom of the front of said vehicle;
  side arms pivotally mounted on their respective one ends from the opposite sides of said frame at points in a vertical plane spaced forwardly of said horizontal axis and projecting in the direction opposite said one direction past said pivot points and pivotable about said axes from a retracted position projecting coextensive with said track to extended positions angling inwardly along said track;

a pair of vertical side brushes mounted on the free extremities of said side brushes;

a top brush fluid cylinder connected between said frame and said top brush arms;

a pair of side brush fluid cylinders connected between said frame and said side brush arm;

spray means mounted on said frame for spraying washing fluid on said vehicle;

reversible drive motor means for driving said truck; and control means including a fluid circuit connected with said cylinders for selectively retracting said arms and alternatively urging said arms to their extended positions to engage said top brush with the top surface of said vehicle and said side brushes on the sides of said vehicle, so said drive motor can drive said trucks along said truck while said top brush washes the front and top surfaces thereof and said side brushes wash the sides thereof, said side arms being operative as said arch carries them rearwardly to clear the back corners of said vehicle to swing further inwardly to wash the back of said vehicle.

2. A vehicle wash apparatus as set forth in claim 1 wherein:

said reversible drive motor means is in the form of an electric motor; and, said control means includes front reversing switch means mounted on said frame, a cam coupled with one of said top brush arms and engagable with said reversing switch means as such arm reaches its fully lowered position, said reversing switch means being electrically coupled to said drive motor means to reverse the direction of rotation thereof when engaged with said cam.

3. A vehicle wash apparatus as set forth in claim 1 wherein:

said reversible drive motor means is in the form of an electric motor; and, said control means includes rear reversing switch means mounted in the path of one of said side brush arms as it retracts its fully extended position, electrically coupled to said drive motor means and operative upon engagement by said one of said side brush arms to reverse said drive motor means.

4. A vehicle wash apparatus as set forth in claim 1 wherein:

said control means includes rear reversing switch means mounted on said frame in the path of one of said side brush arms, electrically coupled to said drive motor means and engaged upon full extension of said one of said side brush arms, said rear reversing switch being operative upon engagement by said one of said side brush arms to reverse said motor means.

5. A vehicle wash apparatus as set forth in claim 1 wherein said side arms are in the form of respective pairs of upper and lower side arms, the upper side arm of each pair being L-shaped in top plan view to, when such side arms are in the extended position, project rearwardly opposite said one direction from said respective one ends and to then turn and project laterally inwadly and wherein:

said top brush arms, when in their lowered positions project downwardly into the bend of such L-shaped upper side arms.

6. A vehicle wash apparatus as set forth in claim 1 for use with a vehicle having a front end supported a predetermined distance above the floor of such stall and wherein:

said top arms are of sufficient length to, when they are in their lowered position, carry said top brush a said predetermined distance from such stall floor.

* * * * *

UNITED STATES PATENT AND TRADEMARK OFFICE
CERTIFICATE OF CORRECTION

PATENT NO. : 4,244,071
DATED : January 13, 1981
INVENTOR(S) : Ivan J. Barber

It is certified that error appears in the above—identified patent and that said Letters Patent is hereby corrected as shown below:

Column 3, line 30, delete "sdie" and substitute therefor --side--, (Patent Office error);

Column 4, line 8, delete "a" (second occurrence), and after "position", insert --with--;

Column 5, line 36, delete "emobidments" and substitute therefor --embodiments--;
line 68, delete "reverse" and substitute therefor --reverses the--; and, Column 6, line 28, after "upper", insert --side arm--.

Signed and Sealed this

Fourth Day of August 1981

[SEAL]

Attest:

Attesting Officer

GERALD J. MOSSINGHOFF
Commissioner of Patents and Trademarks